United States Patent
Sako et al.

(10) Patent No.: US 8,660,293 B2
(45) Date of Patent: Feb. 25, 2014

(54) IMAGED IMAGE DATA PROCESSING APPARATUS, VIEWING INFORMATION CREATING APPARATUS, VIEWING INFORMATION CREATING SYSTEM, IMAGED IMAGE DATA PROCESSING METHOD AND VIEWING INFORMATION CREATING METHOD

(75) Inventors: Yoichiro Sako, Tokyo (JP); Masaaki Tsuruta, Tokyo (JP); Nozomu Ozaki, Kanagawa (JP); Masamichi Asukai, Kanagawa (JP); Taiji Ito, Kanagawa (JP); Akinobu Sugino, Kanagawa (JP); Hidehiko Sekizawa, Tokyo (JP); Akane Sano, Tokyo (JP)

(73) Assignee: Sony Corporation, Tokyo (JP)

( * ) Notice: Subject to any disclaimer, the term of this patent is extended or adjusted under 35 U.S.C. 154(b) by 1021 days.

(21) Appl. No.: 12/079,990

(22) Filed: Mar. 31, 2008

(65) Prior Publication Data

US 2008/0244675 A1    Oct. 2, 2008

(30) Foreign Application Priority Data

Apr. 2, 2007    (JP) .................................. 2007-096353

(51) Int. Cl.
*G06K 9/62*    (2006.01)

(52) U.S. Cl.
USPC .......................................... 382/100; 362/117

(58) Field of Classification Search
None
See application file for complete search history.

(56) References Cited

U.S. PATENT DOCUMENTS

| | | | |
|---|---|---|---|
| 6,628,899 | B1 | 9/2003 | Kito |
| 7,395,544 | B2 * | 7/2008 | Goldman et al. ................. 725/9 |
| 2001/0056225 | A1 * | 12/2001 | DeVito ......................... 600/300 |
| 2003/0018974 | A1 | 1/2003 | Suga |
| 2003/0021591 | A1 | 1/2003 | Grosvenor et al. |
| 2003/0023967 | A1 * | 1/2003 | Kim ................................. 725/9 |
| 2005/0093986 | A1 | 5/2005 | Shinohara et al. |
| 2005/0174470 | A1 * | 8/2005 | Yamasaki .................... 348/345 |
| 2006/0013576 | A1 | 1/2006 | Sauder |
| 2006/0125968 | A1 | 6/2006 | Yokozawa et al. |
| 2008/0239081 | A1 * | 10/2008 | Helbing ....................... 348/169 |
| 2009/0021591 | A1 | 1/2009 | Sako |

FOREIGN PATENT DOCUMENTS

| | | |
|---|---|---|
| CN | 1710843 A | 12/2005 |
| CN | 1787605 A | 6/2006 |
| EP | 1 725 010 A2 | 11/2006 |
| JP | 04-307657 | 10/1992 |
| JP | 2000-023015 A | 1/2000 |
| JP | 2003-110999 A | 4/2003 |
| JP | 2004-320441 A | 11/2004 |
| JP | 2005-136632 A | 5/2005 |
| JP | 2005-303511 A | 10/2005 |
| JP | 2006-245641 A | 9/2006 |
| JP | 2006-254145 A | 9/2006 |
| JP | 2006-319876 A | 11/2006 |
| JP | 2007-018218 A | 1/2007 |

(Continued)

*Primary Examiner* — Brian P Werner
(74) *Attorney, Agent, or Firm* — Wolf, Greenfield & Sacks, P.C.

(57) ABSTRACT

An imaged image data processing apparatus includes obtaining means for obtaining imaged image data, which is imaged by an imaging section that images the sight of a user, extracting means for extracting identification data for identifying a viewed program from the imaged image data obtained by the obtaining means, and transmitting means for transmitting the identification data extracted by the extracting means to an external viewing information creating apparatus.

17 Claims, 12 Drawing Sheets

(56) References Cited

FOREIGN PATENT DOCUMENTS

| | | |
|---|---|---|
| JP | 2007-028130 A | 2/2007 |
| JP | 2007-173992 A | 7/2007 |
| WO | WO 03/050608 A2 | 6/2003 |
| WO | WO 2005/032144 A1 | 4/2005 |
| WO | WO 2005032144 A1 * | 4/2005 |

* cited by examiner

IMAGED IMAGE

IDENTIFICATION DATA

IDENTIFICATION DATA

IMAGED IMAGE

IDENTIFICATION DATA

IMAGED IMAGE

IDENTIFICATION DATA

IMAGED IMAGE DATA PROCESSING APPARATUS, VIEWING INFORMATION CREATING APPARATUS, VIEWING INFORMATION CREATING SYSTEM, IMAGED IMAGE DATA PROCESSING METHOD AND VIEWING INFORMATION CREATING METHOD

CROSS REFERENCES TO RELATED APPLICATIONS

The present invention contains subject matter related to Japanese Patent Applications JP 2007-096353 filed in the Japanese Patent Office on Apr. 2, 2007, the entire contents of which being incorporated herein by reference.

BACKGROUND OF THE INVENTION

1. Field of the Invention

The present invention relates to an imaged image data processing apparatus and imaged image data processing method, which perform processing on imaged image data of a subject sight, and viewing information creating apparatus, viewing information creating method and viewing information creating system, which create viewing information.

2. Description of the Related Art

In the past, the ratings for television broadcasting programs are measured by unique machines placed partial households selected at random by a company providing a ratings calculation service and are averaged by a statistical method.

Systems that grasp something like ratings from newspaper and/or passers-by have also been disclosed as in JP-A-4-307657 and JP-A-2007-18218 (Patent Documents 1 and 2).

SUMMARY OF THE INVENTION

However, the past ratings are measured in a state where a television broadcasting program is being selected and displayed by a television receiver and have nothing to do with whether viewers are actually watching the program or not in this case. In other words, "whether the program is being displayed or not" is only reflected on the ratings. In reality, television receivers are on, but viewers may not view them in many cases under the state "the program is being displayed".

Because of the wide spread of recorders, an increased number of people record broadcasting programs and view them later rather than real-time viewing.

For those reasons, it is difficult to say that the ratings calculated by the past method typically and properly reflect the real state of viewing of television programs. Then, it is difficult for advertisers to fully recognize the effects of advertisements, demanding improvements.

Accordingly, it is desirable to create viewing information such as the number of viewers and the ratings in touch with reality.

According to an embodiment of the present invention, there is provided an imaged image data processing apparatus including obtaining means for obtaining imaged image data, which is imaged by an imaging section that images the sight of a user, extracting means for extracting identification data for identifying a viewed program from the imaged image data obtained by the obtaining means, and transmitting means for transmitting the identification data extracted by the extracting means to an external viewing information creating apparatus.

For example, the obtaining means may have the imaging section integrally and obtain the imaged image data by imaging in the imaging section. The imaging section may have a CCD sensor or a CMOS sensor as an imaging device.

The obtaining means may obtain the imaged image data by imaging in the imaging section through communication with the imaging section, which is provided separately.

The extracting means may identify a displayed image on an image display apparatus within the imaged image data by image analysis processing and extract the identification data from the displayed image on the image display apparatus if the displayed image of the image display apparatus exists within the imaged image data.

The extracting means may extract, as the identification data, all or a part of image data of the displayed image part detected within the imaged image data. Alternatively, the extracting means may extract, as the identification data, text, a mark or a code within the displayed image detected within the imaged image data.

The transmitting means may transmit the identification data extracted by the extracting means to an external viewing information creating apparatus over network communication.

The imaged image data processing apparatus may further include receiving means for receiving viewing information transmitted from an external viewing information creating apparatus and display means for displaying and outputting the viewing information received by the receiving means.

According to another embodiment of the invention, there is provided a viewing information creating apparatus including receiving means for receiving identification data for identifying a viewed program, which is transmitted from an external imaged image data processing apparatus, program identification processing means for performing processing of identifying a viewed program from the identification data received by the receiving means, and information creating means for performing processing of creating viewing information based on the processing result by the program identification processing means.

The viewing information creating apparatus may further include transmitting means for transmitting the viewing information created by the information creating means to an external machine.

According to another embodiment of the invention, there is provided a viewing information creating system including the imaged image data processing apparatus and the viewing information creating apparatus.

According to another embodiment of the invention, there is provided an imaged image data processing method including the steps of obtaining imaged image data, which is imaged by an imaging section that images the sight of a user, extracting identification data for identifying a viewed program from the obtained imaged image data, and transmitting the extracted identification data to an external viewing information creating apparatus.

According to another embodiment of the invention, there is provided a viewing information creating method including the steps of receiving identification data for identifying a viewed program, which is transmitted from an external imaged image data processing apparatus, performing processing of identifying a viewed program from the received identification data, and performing processing of creating viewing information based on the processing result by the processing of identifying a viewed program.

According to another embodiment of the invention, there is provided a viewing information creating apparatus including receiving means for receiving imaged image data, which is transmitted from an external imaged image data processing apparatus, extracting means for extracting identification data for identifying a viewed program from the imaged image data received by the receiving means, program identification processing means for performing processing of identifying a viewed program from the identification data extracted by the extracting means, and information creating means for performing processing of creating viewing information based on the processing result by the program identification processing means.

According to another embodiment of the invention, there is provided a viewing information creating system including the imaged image data processing apparatus and the viewing information creating apparatus. In this case, the imaged image data processing apparatus has transmitting means for transmitting imaged image data, which is imaged by an imaging section that images the sight of a user, to the viewing information creating apparatus.

According to another embodiment of the invention, there is provided a viewing information creating method including the steps of receiving imaged image data, which is transmitted from an external imaged image data processing apparatus, extracting identification data for identifying a viewed program from the received imaged image data, performing processing of identifying a viewed program from the extracted identification data, and performing processing of creating viewing information based on the processing result of the processing of identifying a viewed program.

In other words, according to the embodiments of the invention, an imaged image data processing apparatus side obtains imaged image data of the sight of a user, which is imaged by an imaging section worn by the user, for example.

Then, the imaged image data processing apparatus detects whether the imaged image data contains a displayed image which may be a broadcasted image or not. In other words, whether an image of a broadcasting program, which is displayed on an image display of a television receiver, for example, is contained therein or not is determined. Since the imaged image data is an imaged image of the sight of a user, it may be determined that the user is actually watching the displayed image displayed by a machine such as a television receiver if the displayed image is contained in the imaged image data. For example, if the displayed image is a broadcast image, it may be determined that a user is actually viewing the broadcasting. If a user is not watching a television receiver by looking away or doing something different, for example, the image of the broadcast program is no longer contained in the imaged image data.

Accordingly, if the imaged image data contains a displayed image such as a broadcasting program, for example, which is displayed on a television receiver, for example, identification data for identifying the broadcasting program is extracted. For example, all or apart of the displayed image or text, a mark or a code may be extracted. Then, the identification data is transmitted to a viewing information creating apparatus.

The viewing information creating apparatus side identifies the broadcasting program by image comparison or mark or code analysis based on the received identification data and creates viewing information based on the identification result. In other words, the state that a viewer (user) is actually "watching" a television broadcasting program is detected and is used for creating viewing information.

The viewing information may be information on the viewing state for broadcasting, such as the ratings (that is, the ratings for programs, time periods or commercials, the average ratings and/or instant ratings), information on the number of viewers, the constituent ratio (on ages or genders) of viewers on a program, the ranking of viewed programs and the ratio of the state that a television receiver is on and a program is actually being watched.

The imaged image data processing apparatus side may transmit imaged image data, which is imaged by the imaging section worn by a user, for example, directly to the viewing information creating apparatus, and the viewing information creating apparatus side may extract the identification data.

The embodiments of the invention have an effect that the number of viewers and/or the ratings in touch with reality can be grasped since the state that viewers are actually watching a television broadcast program is detected and is used for creating viewing information.

DESCRIPTION OF THE PREFERRED EMBODIMENTS

Embodiments of the imaged image data processing apparatus, viewing information creating apparatus, viewing information creating system, imaged image data processing method and viewing information creating method according to embodiments of the invention will be described below. An imaging apparatus will be described herein as an example of the imaged image data processing apparatus. The imaged image data processing apparatus according to an embodiment of the invention can be implemented by a machine excluding an imaging apparatus, which will be described later as variation examples.

A server apparatus will be described as an example of the viewing information creating apparatus.

A system that creates information on the ratings and the number of viewers as viewing information will be described as an example.

Embodiments of the invention will be described in the following order:

[1. Appearance Example of Imaging Apparatus];
[2. System Configuration, Imaging Apparatus and Server Apparatus];
[3. System Operation Example I];
[4. System Operation Example II];
[5. System Operation Example III]; and
[6. Effects of Embodiments, Variations and Extension Examples]

1. Appearance Example of Imaging Apparatus

Figure 1A:
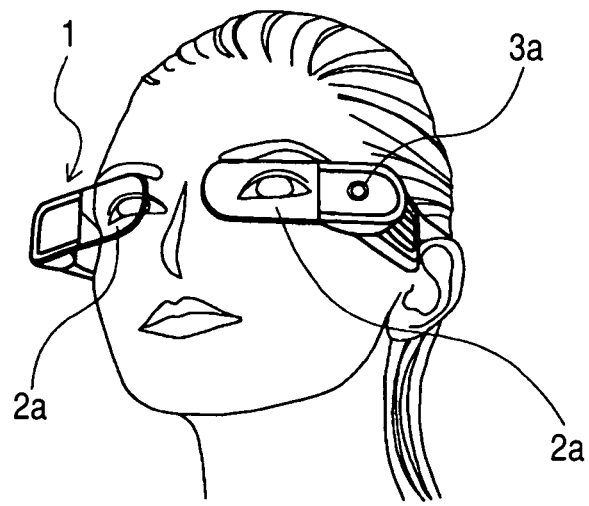
FIGS. 1A and 1B are explanatory diagrams of an appearance example of an imaging apparatus according to an embodiment of the invention.
Figure 1B:
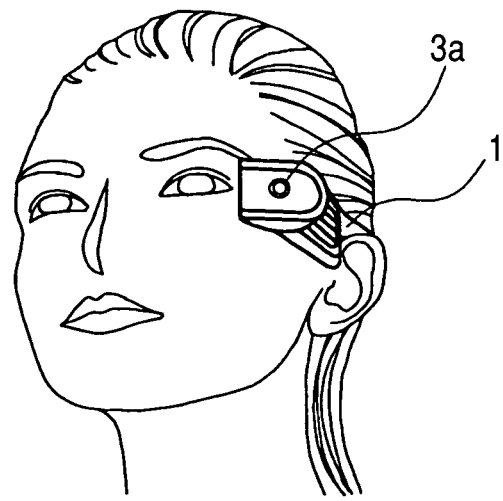

FIGS. 1A and 1B illustrate appearance examples of an imaging apparatus 1 according to an embodiment of the invention.

FIG. 1A shows the imaging apparatus 1 functioning as an eyeglass-shaped display camera. The imaging apparatus 1 has an attachment unit in a frame structure covering the half circumference of the head from both sides to the back, for example, and is worn by a user over both ears, as shown in FIGS. 1A and 1B.

The imaging apparatus 1 includes an imaging lens 3a to the front when a user is wearing it so as to image by handling the direction of the sight of the user as a subject direction.

The imaging apparatus 1 further includes a pair of display panels 2a and 2a for the right and left eyes, which are placed immediately in front of both eyes of a user, that is, where lenses of normal eyeglasses position. The display panel section 2a may be a liquid crystal panel, for example, and the transparent or translucent state can be obtained as shown in FIGS. 1A and 1B by controlling the transmittance. The transparent or translucent state of the display panel section 2a allows a user wearing it at all times to have everyday life without any trouble.

A pair of the display panel sections 2a may be provided correspondingly for both eyes or one display panel section 2a may be provided for one eye.

FIG. 1B shows the imaging apparatus 1 also to be attached to the head of a user, without the display panel sections 2a as shown in FIG. 1A. For example, the imaging apparatus 1 may be attached to the head of a user through an attachment unit to be hung on the ear. Under this state, the imaging lens 3a is placed to the front so as to image by handling the direction of the sight of a user as the subject direction.

Showing the imaging apparatus 1 to be attached to the head of a user through an eyeglass-shaped or head-attachable attachment unit in FIGS. 1A and 1B, various structures may be considered for wearing the imaging apparatus 1 by a user. For example, a user may wear the imaging apparatus 1 through any type of attachment unit such as those of a headphone type, neckband type and ear-hook type. Furthermore, a user may wear the imaging apparatus 1 by attaching it to normal eyeglasses, a visor or a headphone, for example, through an attachment unit such as a clip. Alternatively, it is not typically important to attach the imaging apparatus 1 to the head of a user.

The imaging apparatus 1 according to an embodiment of the invention may be an apparatus to be attached to a user that full-time-images the sight in the direction of the field of view of a user, for example.

The full-time-imaging refers to imaging moving pictures at all times while a user is wearing the imaging apparatus, and the full-time imaging according to this embodiment may also include an operation that images still pictures at intervals of one, several or several-tens seconds. In other words, the full-time imaging refers to continuous or intermittent imaging even without particular imaging operations performed by a user.

Notably, the imaging apparatus 1 that images still pictures and/or moving pictures may have other forms than those shown in FIGS. 1A and 1B. For example, the imaging apparatus 1 may have a microphone that collects external audio to obtain audio data in addition to image data in an imaging operation. Alternatively, the imaging apparatus 1 may have a speaker or earphone section for audio output.

A light emitting section such as an LED (light emitting diode) that illuminates the subject direction or a flash light emitting section for imaging still pictures may be provided near the imaging lens 3a.

2. System Configuration, Imaging Apparatus and Server Apparatus

Figure 2:
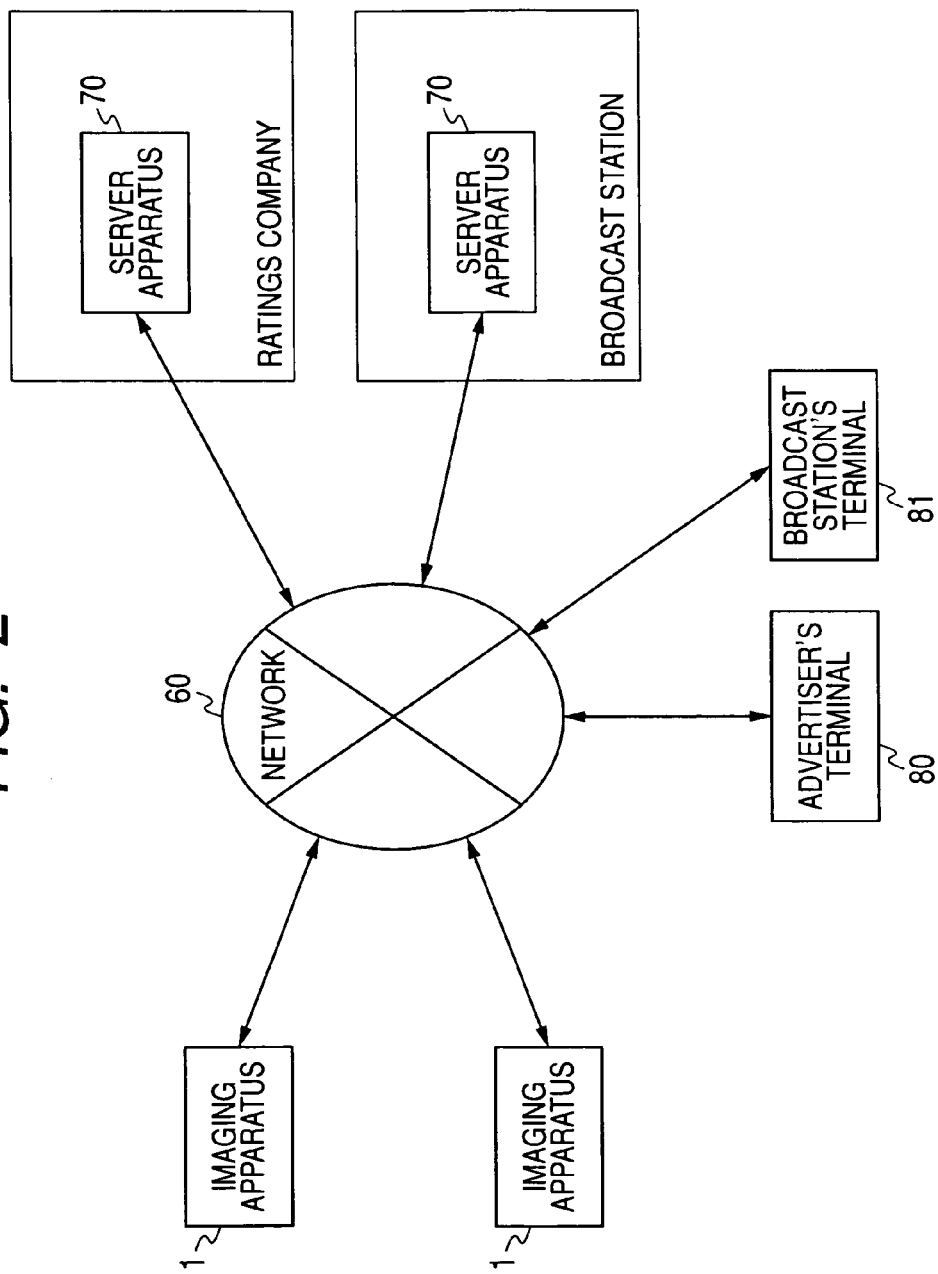
FIG. 2 is an explanatory diagram of a system configuration example according to an embodiment of the invention.

FIG. 2 shows a system configuration example according to an embodiment of the invention. The system according to an embodiment of the invention includes multiple imaging apparatus 1 and a server apparatus 70, which are connected over a network 60 such as the Internet for allowing data communication, as shown in FIG. 2.

The server apparatus 70 may be a server apparatus 70 of a rating company or a server apparatus 70 of a broadcast station. For example, the server apparatus 70 of a rating company may create viewing information for each television broadcast station. The server apparatus 70 of a broadcast station may create viewing information of the broadcast station. Notably, the server apparatus 70 of one broadcast station may be configured to create viewing information for broadcast stations.

The network 60 may be the Internet, a cellular-phone communication network, a PHS communication network, an ad-hoc network, a LAN or the like.

As the system operation example will be described later, each of the imaging apparatus 1 extracts identification data for identifying a viewed program from imaged image data of the sight of a user. The imaging apparatus 1 transmits the extracted identification data to the server apparatus 70 over the network 60.

The server apparatus 70 receives the identification data transmitted from the imaging apparatus 1. Then, the server apparatus 70 performs processing of identifying a viewed program from the received identification data and performs processing of creating viewing information based on the processing result.

A terminal apparatus, which is a machine like a personal computer, may be connected to the network 60. For example, a terminal (advertiser's terminal 80), which is placed in an office of an advertiser who provides a program and/or a terminal (broadcast station's terminal 81) placed in a broadcast station may be allowed to communicate with the server apparatus 70 over the network 60. The server apparatus 70 may transmit the created viewing information to the advertiser's terminal 80 or broadcast station's terminal 81 so as to notify the ratings and/or the number of viewers of a program. The server apparatus 70 may also transmit the created viewing information to the imaging apparatus 1.

A configuration example of the imaging apparatus 1 will be described with reference to FIG. 3.

A system controller 10 may be a microcomputer including a CPU (central processing unit), a ROM (Read Only memory), a RAM (Random Access Memory), a non-volatile memory section and an interface section and functions as a control section that controls the entire imaging apparatus 1.

The system controller 10 performs operational processing and exchanges control signals with the components through a bus 13 based on a program held in the internal ROM to cause the components to perform operations.

An imaging section 3 has an imaging optical system, an imaging device section and an imaging signal processing section.

The imaging optical system in the imaging section 3 includes a lens system having the imaging lens 3a shown in FIGS. 1A and 1B, an aperture, a zoom lens and a focus lens and a driving system for causing the lens system to perform a focus operation or a zoom operation.

The imaging device section in the imaging section 3 includes a solid-state imaging device array that detects imaging light obtained by the imaging optical system and generates an imaging signal by performing photoelectric conversion. The solid-state imaging device array may be a CCD (Charge Coupled Device) sensor array or a CMOS (Complementary Metal Oxide Semiconductor) sensor array.

The imaging signal processing section in the imaging section 3 may include a sample hold/AGC (Automatic Gain Control) circuit, which performs gain adjustment or waveform adjustment on signals obtained by the solid-state imaging device, and/or a video A/D converter and obtains imaged image data, which is digital data. The imaging signal processing section may also perform white balance processing, intensity processing, color signal processing and shake correction processing on imaged image data.

The imaging section 3 including the imaging optical system, imaging device section and imaging signal processing section performs imaging, whereby imaged image data is obtained.

The image data obtained by the imaging operation in the imaging section 3 is processed by an imaging control section 6. The imaging control section 6 performs processing of converting imaged image data to the data in a predetermined image data format and processing of supplying the converted imaged image data to a data extracting section 12, a storage section 14, a communication section 15 and/or a display control section 7 according to the operational situation, under the control of the system controller 10.

Based on an instruction by the system controller 10, the imaging control section 6 may control the ON/OFF of the imaging operation in the imaging section 3, control the driving of the zoom lens and/or focus lens of the imaging optical system, control the sensitivity and/or frame rate of the imaging device section, control the parameter for processing in the imaging signal processing section and/or define processing to be performed.

The data extracting section 12 may perform image analysis processing on the imaged image data obtained by the imaging section 3 or the imaging control section 6 and creates identification data.

The image analysis processing in this case refers to processing of detecting the displayed image on a display apparatus such as a television receiver in order to extract identification data.

The identification data refers to information to be used by the server apparatus 70 for identifying a viewed program and is all or a part of image data of the broadcasted image part detected within imaged image data. Alternatively, the identification data may be information in text, a mark or a code within a displayed image detected within imaged image data. As operations by the data extracting section 12 will be described later, the identification data may be specifically those shown in FIGS. 6B and 6C and 7B and 7D.

Figure 6A:
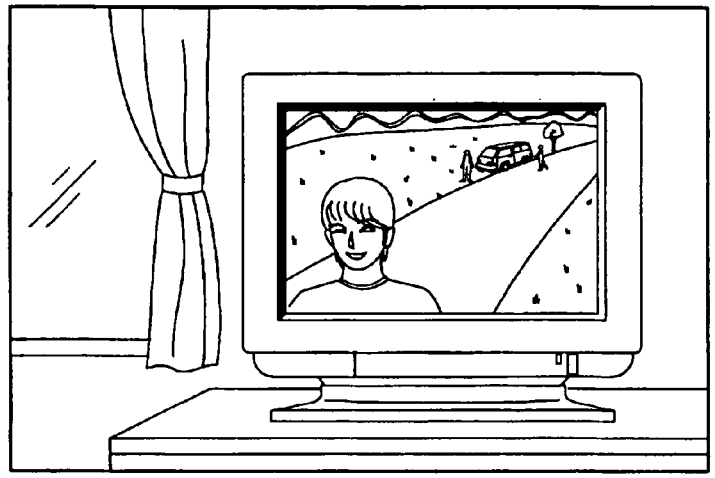
FIGS. 6A to 6C are explanatory diagrams of the extraction of identification data according to an embodiment of the invention.
Figure 6B:
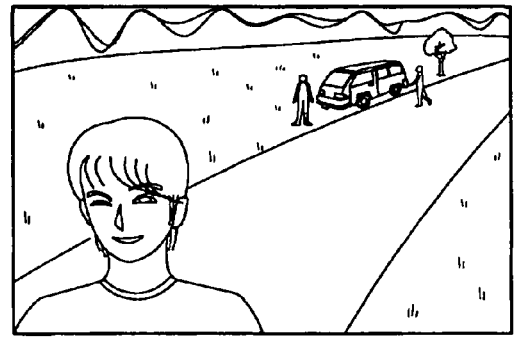
Figure 6C:

FIG. 6A shows an image functioning as imaged image data, which contains a television receiver, and the television receiver displays a broadcast program. FIGS. 6B and 6C are all or a part of the image of the broadcast program. This kind of image data may be used as the identification data.

Figure 7A:
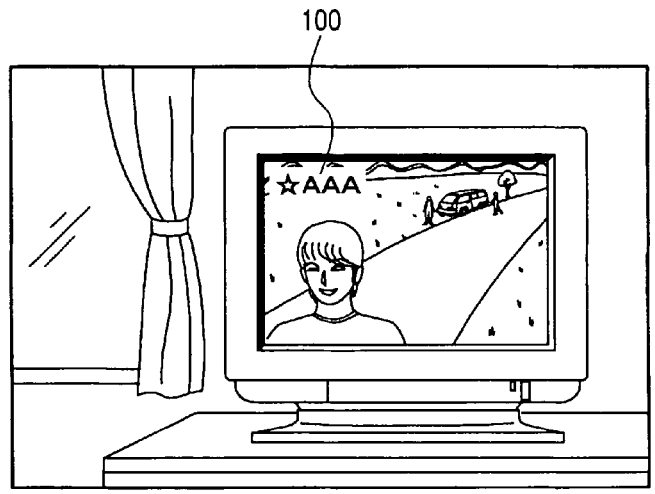
FIGS. 7A to 7D are explanatory diagrams of the extraction of identification data according to an embodiment of the invention.
Figure 7B:

FIG. 7A shows a case where a mark 100 such as a logo of a broadcast station or text of the name of a broadcast station is displayed on the screen of a broadcast program. FIG. 7B shows an example in which the image of the mark 100 is used as the identification data in that case.

Figure 7C:
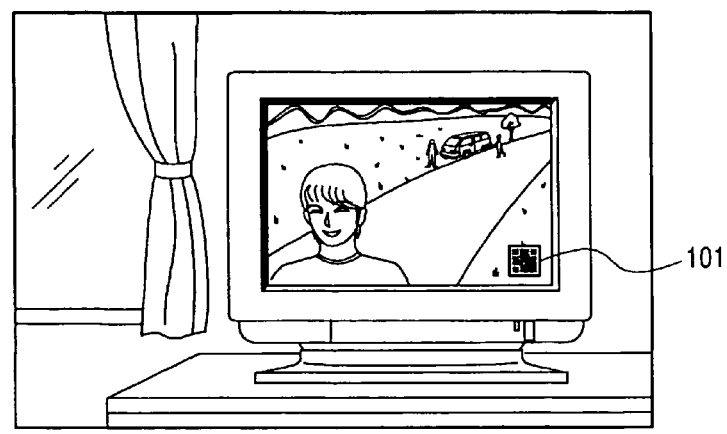
Figure 7D:

FIG. 7C shows a case where a code 101 like a two-dimensional barcode such as a QR code containing identification information such as the name of a broadcast station is displayed on the screen of a broadcast program. FIG. 7D shows an example in which the image of the code 101 is used as the identification data.

The extraction of the identification data will be described later.

Notably, it is difficult to determine whether the display apparatus contained in the imaged image data is displaying television broadcasting or not. For that reason, the displayed image on the display apparatus contained in the imaged image data may not be a television broadcast image, but it is not important to determine it for the extraction of the identification data. This is because it can be identified by the server apparatus 70 side.

The data extracting section 12 may be a microcomputer or a DSP (Digital Signal Processor). Showing in the separate block from the system controller 10 being a microcomputer in FIG. 3, the operations by the data extracting section 12 may be implemented by software to be up and running in the system controller 10.

The configuration that provides display to a user in the imaging apparatus 1 may include a display section 2 and a display control section 7.

The display section 2 includes the display panel section 2a, which may be a liquid crystal panel, and a display driving section that drives the display of the display panel section 2a.

The display driving section includes a pixel driving circuit that displays image data supplied from the imaging control section 6 on the display panel section 2a, which may be a liquid crystal display. The pixel driving circuit applies a drive signal based on a video signal at a predetermined horizontal/vertical driving time to each of the pixels laid out in a matrix form on the display panel section 2a to implement the display.

Under the control of the system controller 10, the display control section 7 drives the pixel driving circuit in the display section 2 to cause the display panel section 2a to implement predetermined display.

In other words, the display panel section 2a is caused to implement the display by the imaging monitor in the imaging section 3, the playback of imaged image data captured in the storage section 14, the display of data received by the communication section 15, display of a character and so on.

For the display, the display control section 7 may perform intensity level adjustment, color correction, contrast adjustment, sharpness (edge enhancement) adjustment and so on. The display control section 7 may create an enlarged image in which a part of image data is enlarged or a reduced image, perform soft-focusing, pixelization, negative processing, highlighting of a part of an image, image effect processing such as changing the entire color atmosphere, separate or synthesize images for division display of an imaged image, perform processing of creating a character image or a conceptual image and synthesizing the created image to an imaged image.

The display control section 7 can control the display driving section based on an instruction by the system controller 10 and thus controls the transmittance of the pixels of the display panel section 2a to obtain a transparent or translucent state.

The storage section 14 is used for storage of data. The storage section 14 may be used for storage of imaged image data, for example.

The storage section 14 may be a solid-state-memory such as a RAM and a flash memory or may be an HDD (Hard Disk Drive).

The storage section 14 may be, instead of an internal recording medium, a portable recording medium such as a memory card internally containing a solid-state memory or a read write drive supporting a recording medium such as an optical disk, a magnetooptical disk and a hologram memory.

Apparently, the storage section 14 may include both of an internally contained memory such as a solid-state memory and an HDD and a read write drive for a portable recording medium.

The storage section 14 records and stores imaged image data under the control of the system controller 10. The storage section 14 reads out recorded data and supplies it to the system controller 10 and/or display control section 7 under the control of the system controller 10.

The communication section 15 performs the exchange of data with an external machine such as the server apparatus 70. The communication section 15 performs network communication through near field communication to a network access point over a wireless LAN or Bluetooth, for example.

Figure 4:
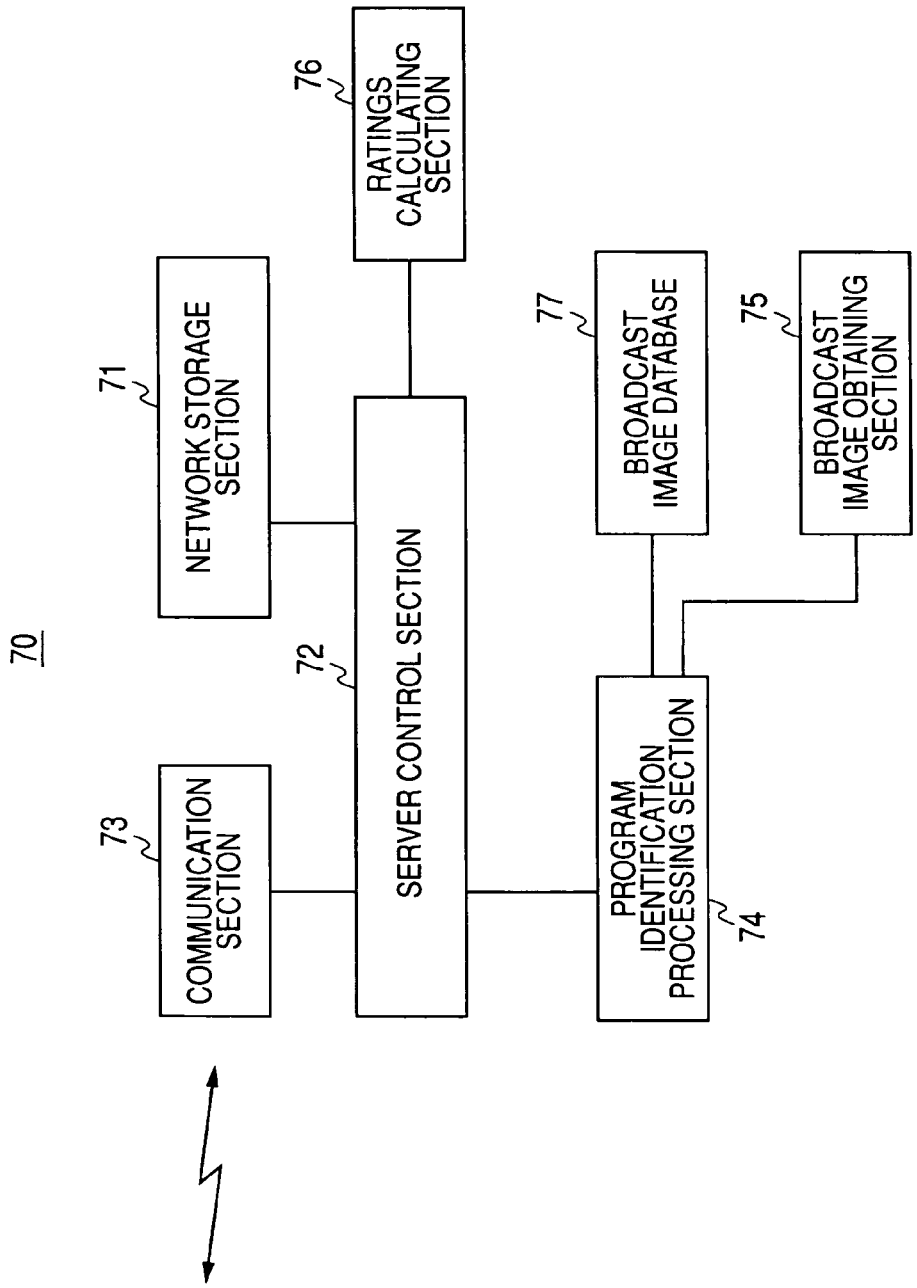
FIG. 4 is a block diagram of a server apparatus according to an embodiment of the invention.

Next, FIG. 4 shows a configuration example of the server apparatus 70.

As described above, the server apparatus 70 is an apparatus that receives identification data from the imaging apparatus 1 through communication over the network 60 and creates viewing information by using the identification data.

The server apparatus 70 includes a server control section 72, a network storage section 71, a communication section 73, a program identification processing section 74, a broadcast image obtaining section 75, a rating calculating section 76 and a broadcast image database 77.

The network storage section 71 may be implemented by an HDD, for example, and is used for storing data such as identification data transmitted from the imaging apparatus 1 over the network 60 or temporarily storing data to be transmitted to the imaging apparatus 1, the advertiser's terminal 80 and/or the broadcast station's terminal 81, for example.

The communication section 73 performs data communication with the communication section 26 of the imaging apparatus 1 and/or the communication section of the advertiser's terminal 80 and the broadcast station's terminal 81 over the network 60.

The server control section 72 performs important operational control as the server apparatus 70. In particular, the server control section 72 performs control operations for creating and/or transmitting viewing information such as the ratings.

The program identification processing section 74 performs processing of identifying a broadcast program based on identification data.

The broadcast image obtaining section 75 obtains a television broadcast image (realtime broadcast image) currently on the air in each broadcast station, for example. In a case where the broadcast image obtaining section 75 is in the server apparatus 70 of a rating company, for example, the broadcast image obtaining section 75 may be configured to receive broadcast images of multiple broadcast stations at all times as a tuner apparatus for television broadcasting. If in the server apparatus 70 of a broadcast station, the broadcast image obtaining section 75 may be a device to which a broadcast image on the air by the broadcast station can be input.

In a case where the identification data transmitted from the imaging apparatus 1 is image data of a broadcast image, obtaining the television broadcast image currently on the air by the broadcast image obtaining section 75 allows the program identification processing section 74 to compare the image of the identification data and the broadcast image and determine the broadcast station that has broadcasted the image data, which is the identification data.

In other words, it is only important to configure the broadcast image obtaining section 75 to obtain a broadcast image to be compared with the image of the identification data and more specifically to obtain a realtime broadcast image of a broadcast station that needs to check the ratings through the server apparatus 70.

In a case where the server apparatus 70 of a rating company needs to research the ratings of terrestrial broadcast stations and satellite broadcast stations, for example, the broadcast image obtaining section 75 may be configured to supply all of broadcast images of the terrestrial broadcast stations and satellite broadcast stations to the program identification processing section 74 at all times.

The program identification processing section 74 in this case can identify the broadcast station which has broadcasted the image data functioning as identification data by comparing the image of the identification data and each broadcast image. Alternatively, if the image as the identification data does not agree with broadcast images of any broadcast stations, it can be guessed that the image as the identification data, which has been extracted by the imaging apparatus 1 side, may not be a broadcast image (that is, not a broadcast image on the air of broadcast stations subject to the ratings measurement at least).

In a case where the server apparatus 70 of a broadcast station needs to check the ratings of the station, for example, the broadcast image obtaining section 75 is configured to supply the current broadcast image of the station to the program identification processing section 74 at all times.

The program identification processing section 74 in this case can identify whether the image data as identification data is the broadcast image of the station or not by comparing the image as the identification data and the broadcast image. If the image as the identification data does not agree with the broadcast image of the station, it can be guessed that the image as the identification data, which has been extracted by the imaging apparatus 1 side, is not the broadcast image of the station (that is, not the current broadcast image at least).

The program identification processing section 74 may properly store realtime broadcast images for a predetermined period of time temporarily in consideration of the time lag for communication and/or processing in the operation of comparing the image as identification data and the realtime broadcast image and then compare the realtime broadcast images in a period of time to some extent from the present to the past and the image as identification data.

The broadcast image database 77 accumulates and stores past broadcast images of one or multiple broadcast stations to be searched for viewing information such as the ratings. For example, the broadcast image database 77 may store past broadcast images for a specific period of time such as past three days, past one week and past one month.

This becomes important for reflecting the fact that a user of the imaging apparatus 1 watches a recorded broadcast image to viewing information. In other words, if the image as identification data does not agree with a realtime broadcast image from the broadcast image obtaining section 75, the image as identification data may be possibly one in a recorded program being watched by a user.

In order to also reflect the viewing of a recorded program to viewing information, the program identification processing section 74 compares the image as identification data with a past broadcast image stored in the broadcast image database 77 after the image as identification data does not agree with a realtime broadcast image. If the data as identification data agrees with one image, it can be determined that the user of the imaging apparatus 1 is watching past broadcasting by one broadcast station.

In this way, the program identification processing section 74 can identify the broadcast station being watched by a user by comparing the image as identification data and a realtime broadcast image and/or a past broadcast image.

However, other identification methods are available instead of the image comparison. In a case where a logo, a mark, a code or text, for example, is transmitted as the identification data as described above, the broadcast station being watched by a user may be identified by comparing the image of the mark, for example, with the marks of broadcast stations, identifying the letters of the name of the broadcast station or decoding the code such as a QR code, for example.

If the broadcast station relating to the identification data is identified, the program identification processing section 74 notifies the broadcast station identification information to the server apparatus 70. Alternatively, other information like a realtime broadcast image or a past broadcast image may be notified.

The ratings calculating section 76 counts the number of viewers and/or calculates the ratings for each broadcast station to be searched based on an instruction by the server control section 72.

The ratings can be calculated by using the number of viewers for each broadcast station based on the identification by the program identification processing section 74 where the total number of imaging apparatus 1 that can communicate with the server apparatus 70 or the total number of imaging apparatus 1 during communication is the population.

The ratings to be calculated may be the instant ratings, the ratings for each program, the ratings for each commercial, the average ratings for each time period, the ratings for realtime/recorded programs, program ratings in consideration of the number of viewers of recorded programs and/or the like.

The viewing information calculated by the ratings calculating section 76, that is, the number of viewers of each broadcast station or the ratings as described above may be stored in the network storage section 71 and/or can be transmitted through the communication section 73, under the control of the server control section 72. In other words, the viewing information can be provided to the imaging apparatus 1, advertiser's terminal 80 and/or broadcast station's terminal 81.

The system configuration example and configurations of the imaging apparatus 1 and server apparatus 70 have been described for the illustration purpose only. Apparently, the addition or deletion of a component or components is possible according to the operation example or function to be actually implemented.

3. System Operation Example I

Figure 5:
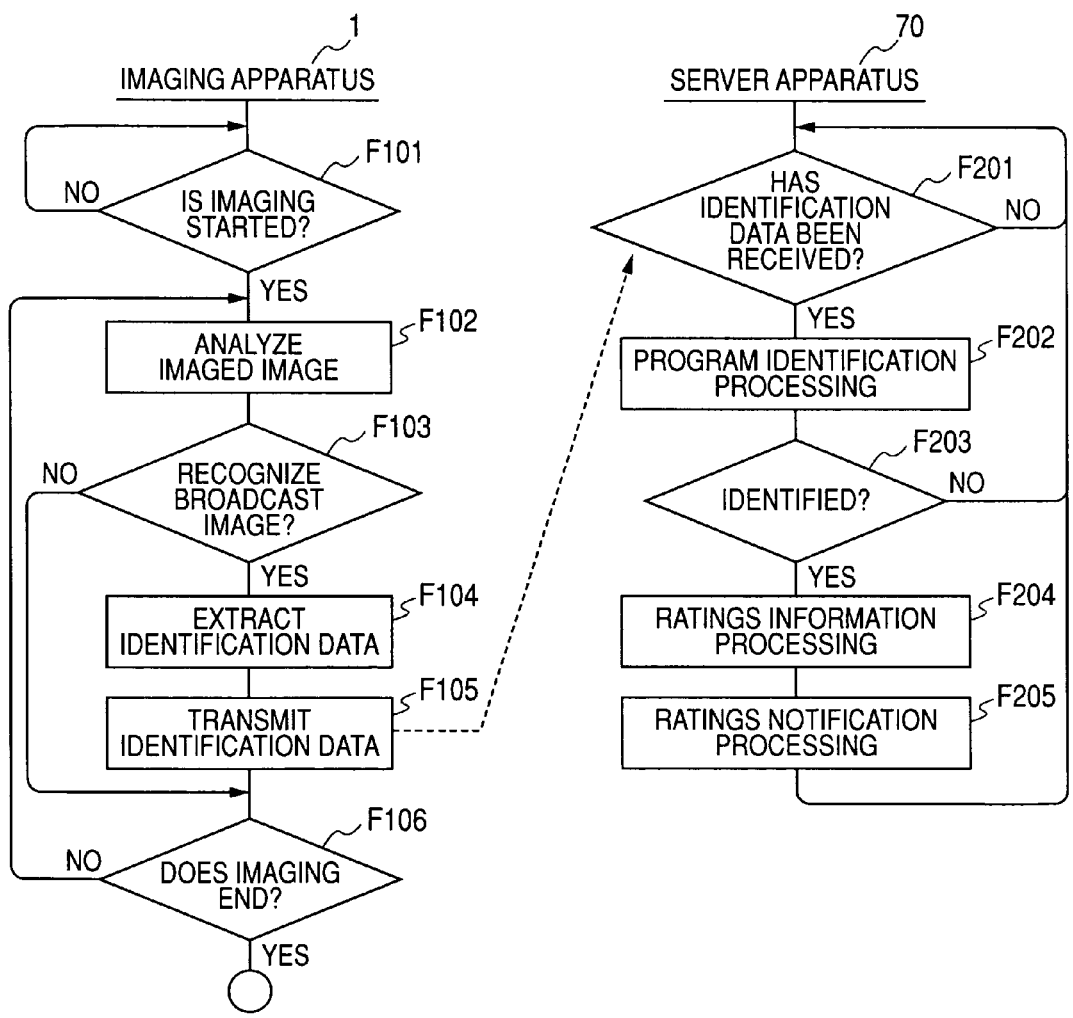
FIG. 5 is a flowchart of System Operation Example I according to an embodiment of the invention.

A system operation example to be implemented between the imaging apparatus 1 and server apparatus 70 as described above will be described. FIG. 5 shows a processing operation by the imaging apparatus 1 and a processing operation by the server apparatus 70. The processing in steps F101 to F106 in the imaging apparatus 1 is performed by the applicable component or components under the control of the system controller 10. FIG. 5 only shows the processing relating to identification data to be used for creation of viewing information.

The processing in steps F201 to F205 in the server apparatus 70 is performed by the applicable component or components under the control of the server control section 72. FIG. 5 only shows the processing relating to the creation of viewing information.

In the imaging apparatus 1, the processing in steps F102 to F105 is repeatedly performed in response to the start of imaging. In other words, the processing in steps F102 to F105 is repeated until the imaging in step F106 ends.

The imaging apparatus 1 performs the full-time imaging (moving picture serial imaging or still picture imaging at predetermined time intervals) as described above. A user may wear the imaging apparatus 1 as shown in FIG. 1A or 1B, for example, and the system controller 10 advances the processing from step F101 to F102 when the power is on.

In step F102, the system controller 10 controls the data extracting section 12 to perform analysis processing on imaged image data.

The data extracting section 12 performs the analysis processing on the imaged image data supplied from the imaging control section 6 for detecting a display apparatus such as a television receiver.

The imaged image data obtained by the imaging section 3 or the imaging control section 6 is an image of the sight of a user. When a user is watching some display apparatus (such as a television receiver, a monitor of a personal computer, a screen of a cellular phone and others), the display apparatus is contained in the imaged image data.

FIG. 6A shows the imaged image in a case where a user is watching a television receivers (that is, a television broadcast program) indoors, and the television receiver is imaged as a part of the indoor sight.

An area having a square contour is detected first in order to detect the screen area of the display apparatus such as a television receiver within imaged image data. In particular, an area in a square at an aspect ratio 4:3 or 16:9 may be detected.

However, the square in this case includes not only a rectangle but also a form such as a trapezoid and a parallelogram. This is because the screen of the imaged television receiver may not be a rectangular area typically at some positions, angles of elevation and angles of a user against the television receiver. The part having a square (rectangular, trapezoidal or parallelogram) contour within an imaged image is therefore extracted on the imaged image data.

Notably, the screen in a rectangular form is generally shown in a trapezoidal or parallelogram form on the image according to the direction of imaging, angle of elevation and/or position in imaging and/or the laws of perspective. For that reason, the analysis processing is also effective that guesses the direction of imaging, the angle of elevation and so on based on the states of entire contours within an image (such as contours of the cabinet of the television receiver and surrounding furniture) and extracting the trapezoid or parallelogram, which can be guessed as being originally (or really) rectangular.

After a square area is detected, whether the intensity within the detected square area is high or not or whether the intensity changes significantly among frames or not is determined.

If the inside of the square area has a high intensity or significant intensity changes, it can be guessed that the part may be some display apparatus that displays something.

In other words, it can be guessed that a user is possibly watching a television broadcast program.

Notably, it is difficult to determine whether the one being actually watched by a user is a broadcasting program or not in this stage, but it is not a problem.

For example, a display apparatus may display various images such as a playback image of a television broadcasting program or a recorded television broadcasting program, a playback image on a medium such as a DVD, a playback image of a home video, an image on a monitor of a personal computer, for example, and a photograph image imaged by a digital still camera.

It is not typically important for the analysis processing by the data extracting section 12 to distinguish the broadcast images as described above and other images from the viewpoint of the creation of viewing information though the image of a television broadcasting program currently on the air or a playback image of a recorded television broadcasting program is subject to the calculation of the ratings. This is because the server apparatus 70 side can also determine whether the subject image is an image of a broadcast program or not.

After detecting the image of the display apparatus currently displaying within imaged image data, the data extracting section 12 moves from step F103 to F104 to extract identification data from the data of the displayed image on the display apparatus.

On the imaged image in FIG. 6A, for example, identification data is extracted from the imaged image since the image of the display apparatus currently displaying is detected as a square area. As the identification data, image data of the image itself within the square area may be extracted, as shown in FIG. 6B, for example. In other words, the identification data may be the image being viewed by a user on a display apparatus.

Alternatively, the identification data may be a part of the image within the square area, as shown in FIG. 6C.

Alternatively, after an area having a square contour is detected, whether text is contained within the square or not may be determined. For example, pattern recognition may be performed on the text. Notably, whether an image, which can be guessed as a logo or a mark, is contained therein or not may be detected by storing logos and/or marks in advance and performing image pattern matching therewith.

Then, if the mark 100 such as a logo mark and text is displayed within a square area as shown in FIG. 7A, for example, the image of the mark 100 such as a logo mark and text may be extracted as shown in FIG. 7B, which is then handled as the identification data. If the mark 100 is text, character recognition may be performed thereon, and the resulting text data may be handled as the identification data.

If the code 101 such as a QR code is displayed within the square area as shown in FIG. 7C, the image of the code 101 may be extracted and be handled as the identification data, as shown in FIG. 7D. A decoding processing function if any for the code 101 in the data extracting section 12 may perform decoding processing thereon, and the resulting decoded data may be handled as the identification data.

After the data extracting section 12 extracts the identification data, the system controller 10 advances the processing to step F105 to transmit the identification data through the communication section 15 to the server apparatus 70.

If imaging is being continued, that is, if the power is not off, the processing returns from step F106 to F102.

Notably, if the image of the display apparatus currently displaying is not detected within the imaged image data as a result of the analysis on the imaged image data in step F102, the processing moves from step F103 to F106 and returns to step F102 if the imaging is being continued. For example, the data extracting section 12 may notify the system controller 10 of the fact that no display apparatus exist within the imaged image data. The system controller 10 in response thereto after step F102 controls the next imaged image data to be transferred from the imaging control section 6 to the data extracting section 12 and controls the data extracting section 12 to perform the analysis processing on the imaged image data.

The server apparatus 70 performs the processing at and after step F202 every time identification data is transmitted from the imaging apparatus 1.

In other words, the server control section 72 receives identification data from one imaging apparatus 1 through the communication section 73 and then advances the processing from step F201 to F202 to control the program identification processing section 74 to perform the program identification processing using the received identification data.

If the identification data is a broadcast image data, the program identification processing section 74 identifies the broadcast station by comparing the identification data with a realtime broadcast image or past broadcast images. If not, the processing may result in no applicable broadcast station.

If the identification data is text, a mark or a code, the broadcast station is identified by comparing between marks, determining the letters or decoding the code. If not, the processing may result in no applicable broadcast station.

If the broadcast station is not identified, the program identification processing section 74 notifies the server control section 72 of the fact that the broadcast station is not identified. In this case, the server control section 72 returns the processing from step F203 to F201 and awaits the reception of the next identification data.

Though there may be a situation where a user on the imaging apparatus 1 side is watching an image, which is not a television broadcast image, on a display apparatus, as described above, the image data extracted as identification data in this case does not agree with broadcast images as a result of the comparison, and the processing results in no applicable broadcast station.

If the broadcast station is identified, the program identification processing section 74 notifies the server control section 72 of the information on the identified broadcast station. Notably, the information on the type of image between a realtime broadcast image and a past broadcast image may be also notified.

In this case, the server control section 72 advances the processing from step F203 to F204 and controls the ratings calculating section 76 to perform the processing for viewing information.

The ratings calculating section 76 may perform processing of counting up the number of viewers for the broadcast station, which is currently identified, calculating the ratings and/or updating them based on the calculation result. The ratings may be the instant ratings, the ratings for each time period, the ratings for each program, the ratings for each commercial, the ratings for realtime/recorded programs or the program ratings in consideration of the number of viewers of recorded programs and/or the like.

Then, the server control section 72 in step F205 performs processing of notifying the viewing information calculated (updated) by the ratings calculating section 76. That is, the server control section 72 transmits the viewing information through the communication section 73 to the advertiser's terminal 80 and/or broadcast station's terminal 81 and provides the ratings research result.

The processing in step F205 may be performed at predetermined time intervals or may be performed all at once a day instead of every time after step F204.

In the system operation example as described above, the processing based on identification data from many imaging apparatus 1 is performed in the server apparatus 70, and viewing information is created. Then, the viewing information is notified to advertisers and/or broadcast stations.

4. System Operation Example II

Figure 8:
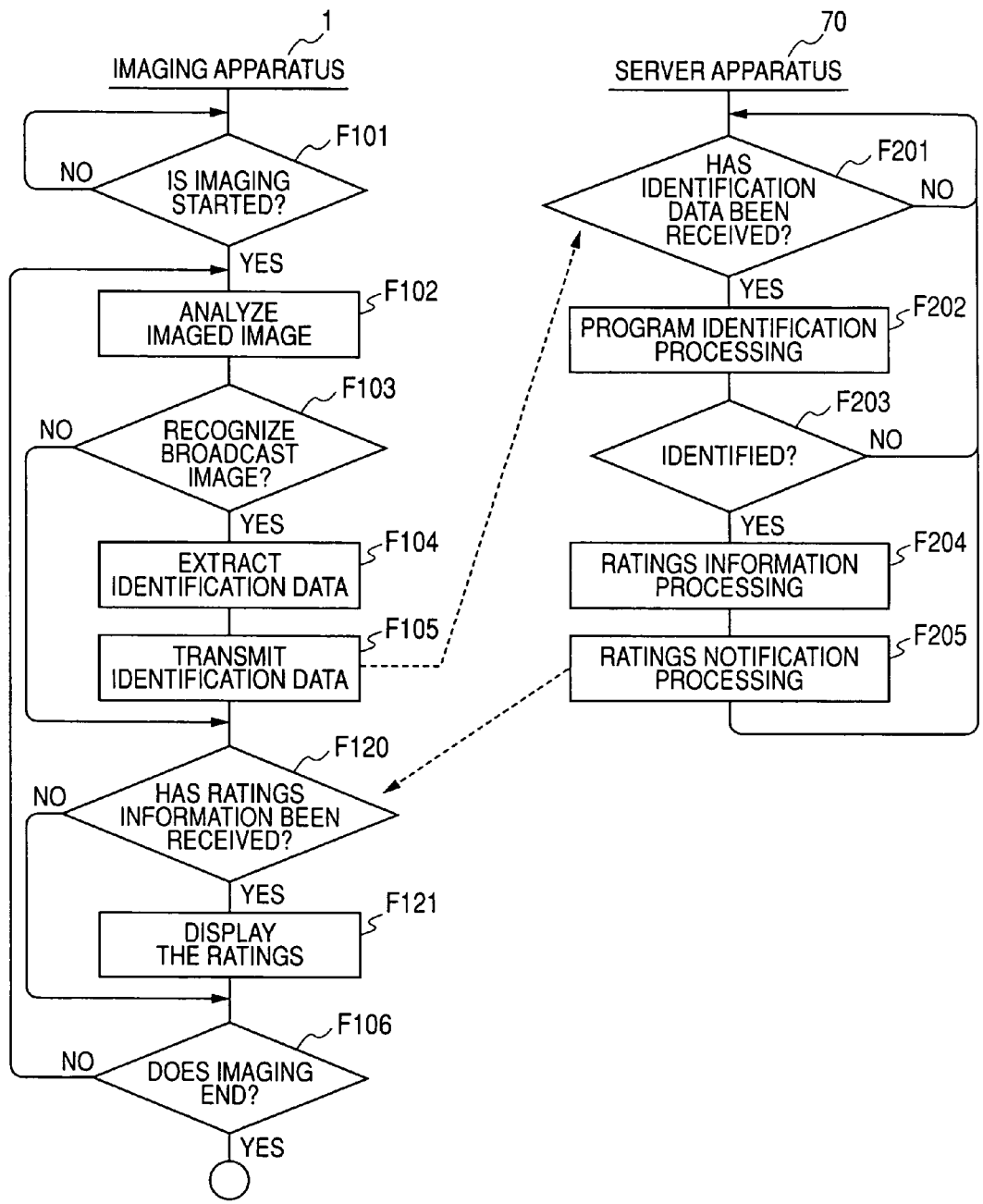
FIG. 8 is a flowchart of System Operation Example II according to an embodiment of the invention.

FIG. 8 shows System Operation Example II. Steps F101 to F105 by the imaging apparatus 1 in FIG. 8 are the same as steps F101 to F105 in FIG. 5, and the processing in steps F201 to F204 by the server apparatus 70 are also the same as the processing in steps F201 to F204 in FIG. 5.

In this example, the server apparatus 70 transmits the viewing information calculated at a predetermined time to the imaging apparatus 1 in the ratings notification processing in step F205.

On the imaging apparatus 1 side after the processing in steps F102 to F105, the system controller 10 determines whether viewing information has been received from the server apparatus 70 in step F120. If viewing information has been received from the server apparatus 70 through the communication section 15, the system controller 10 advances the processing to step F121 to control the display section 2 to implement the display based on the received viewing information.

For example, viewing information on the program being currently viewed by a user or the ratings of broadcast stations may be displayed.

By notifying the current ratings of broadcast stations by the server apparatus 70, for example, the imaging apparatus 1 can display a list of the ratings of broadcast stations.

The imaging apparatus 1 side can display the ratings of the program being watched by a user by notifying the imaging apparatus 1, which is the sender of identification data, of the ratings of the broadcast station identified from the identification data by the server apparatus 70.

Alternatively, by notifying the ratings for broadcast stations and the information on the name of the broadcast station identified based on identification data to the imaging apparatus 1 by the server apparatus 70, the imaging apparatus 1 side may not only display the ratings of the program currently being watched by a user but also display the ratings of other stations.

In other words, according to System Operation Example II in FIG. 8, a user can learn the current ratings while viewing television broadcasting.

5. System Operation Example III

Next, System Operation Example III will be described.

Figure 9:
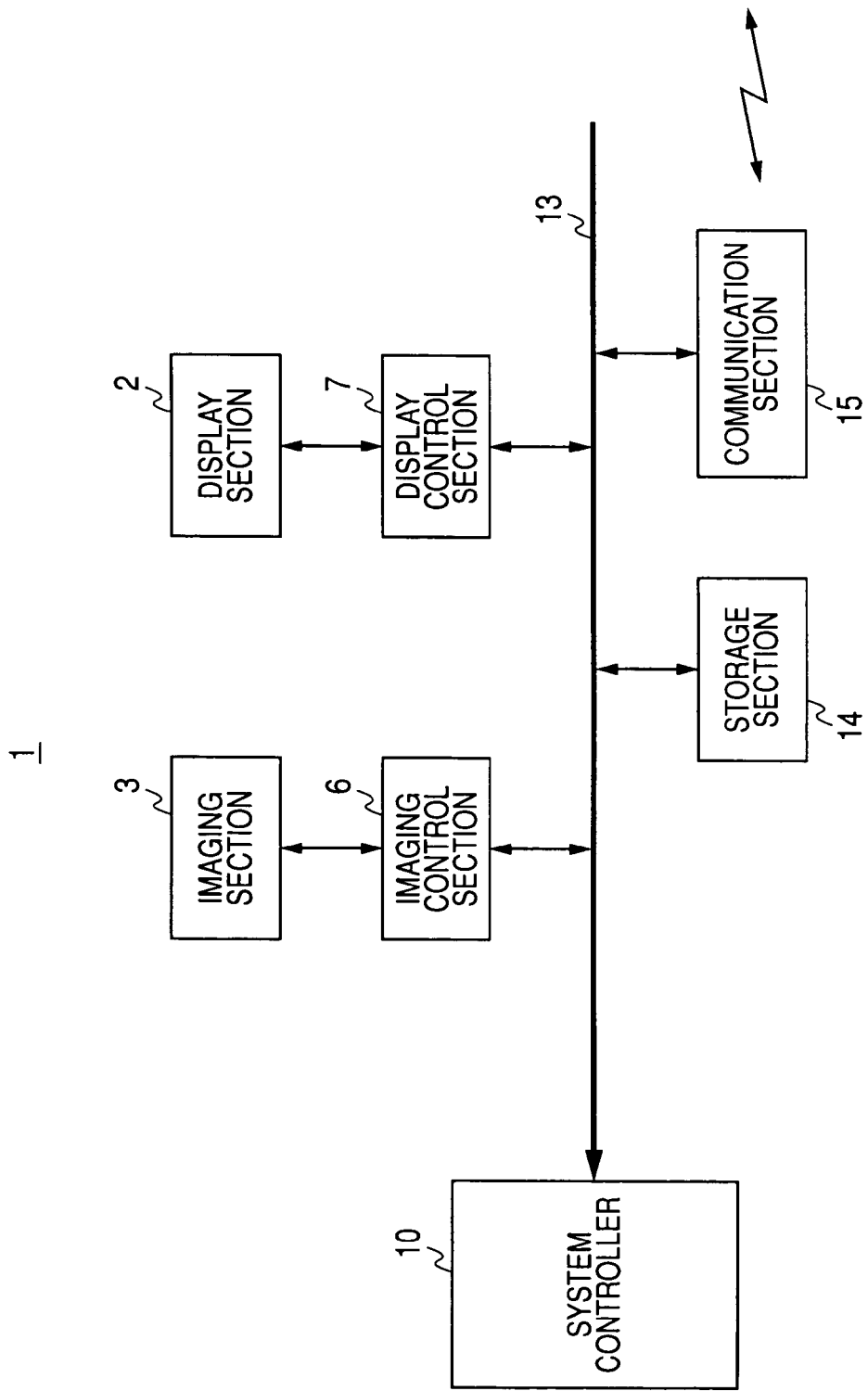
FIG. 9 is a block diagram of an imaging apparatus corresponding to System Operation Example III according to an embodiment of the invention.
Figure 10:
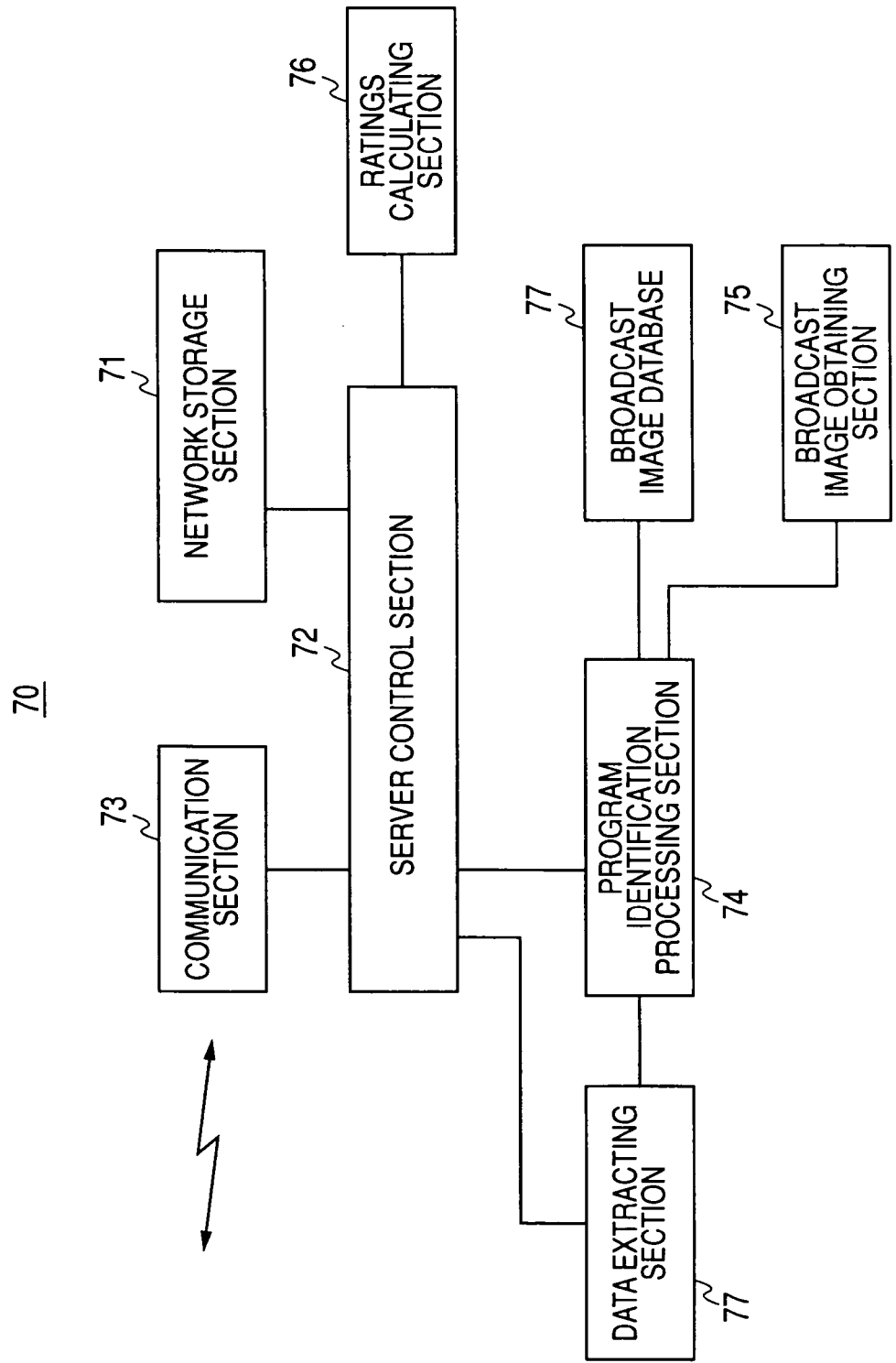
FIG. 10 is a block diagram of a server apparatus corresponding to System Operation Example III according to an embodiment of the invention.

FIGS. 9 and 10 show configurations of the imaging apparatus 1 and server apparatus 70 that implement System Operation Example III.

Figure 3:
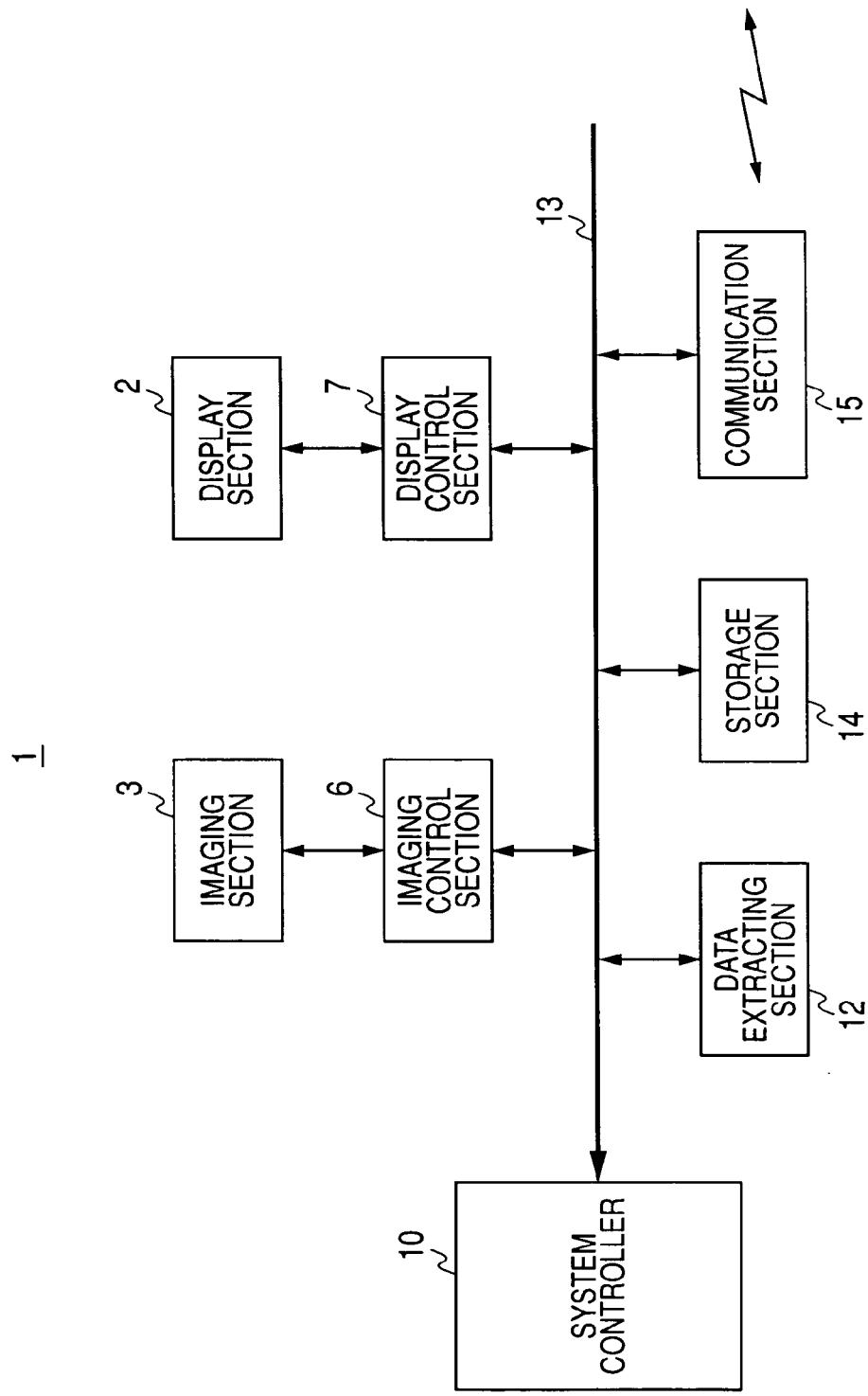
FIG. 3 is a block diagram of an imaging apparatus according to an embodiment of the invention.

The imaging apparatus 1 in FIG. 9 excludes the data extracting section 12 in the configuration illustrated in FIG. 3.

The server apparatus 70 in FIG. 10 includes a data extracting section 77 in addition to the configuration in FIG. 4. The processing operation by the data extracting section 77 is the same as that of the data extracting section 12 on the imaging apparatus 1 side as described above.

Figure 11:
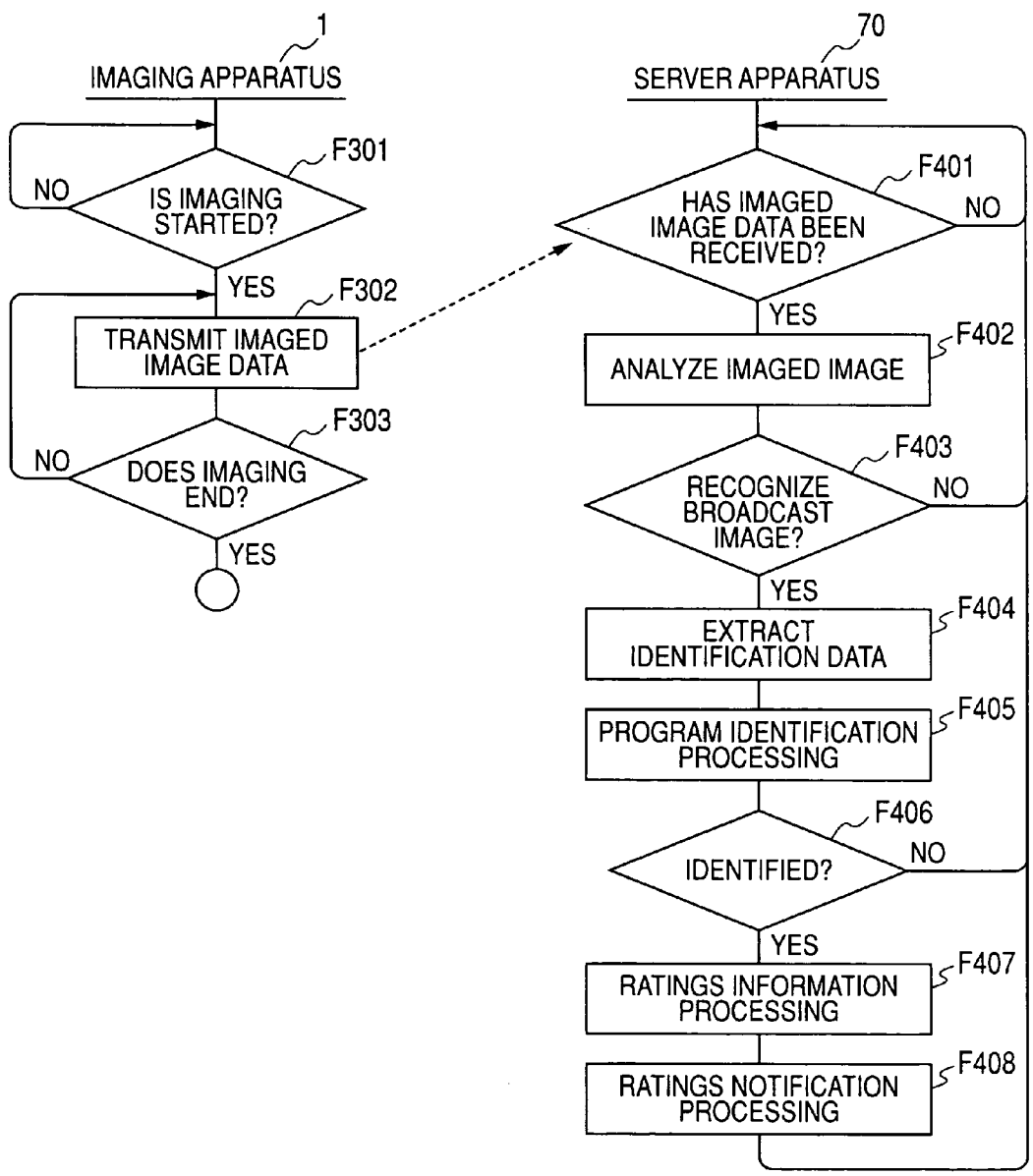
FIG. 11 is a flowchart of System Operation Example III according to an embodiment of the invention.

FIG. 11 shows processing by the imaging apparatus 1 and the server apparatus 70.

In this case, the imaging apparatus 1 after imaging is started in step F301 performs processing of transmitting imaged image data in step F302 until the end of imaging in step F303.

In other words, in an operation for moving picture imaging, the system controller 10 controls to continuously perform the processing of transmitting the imaged image data obtained by the imaging section 3 and imaging control section 6 to the server apparatus 70 through the communication section 15.

In an operation of imaging still pictures intermittently, the system controller 10 controls to transmit the imaged image data to the server apparatus 70 through the communication section 15 every time imaging is performed.

The server apparatus 70 performs processing at and after step F401 every time imaged image data is transmitted from the imaging apparatus 1.

In other words, the server control section 72 after receiving imaged image data from one imaging apparatus 1 through the communication section 73 advances the processing from step F401 to F402 to control the data extracting section 77 to perform analysis processing on the received imaged image data.

In other words, the data extracting section 77 performs analysis processing on the imaged image data for detecting a display apparatus such as a television receiver. The processing is the same as the processing by the data extracting section 12 in step F102 shown in FIG. 5 and determines whether a displayed image by a display apparatus is contained in the imaged image data or not by determining whether the imaged image data internally contains an area having a square contour with a high intensity or many intensity changes inside.

If any image of a display apparatus currently displaying is not detected within the imaged image data as a result of the analysis on the imaged image data in step F402, the server control section 72 returns the processing from step F403 to F401 and awaits the reception of the next imaged image data.

On the other hand, if the data extracting section 77 determines that an image of a display apparatus exists within the imaged image data, the processing moves from step F403 to F404 where identification data is extracted.

In other words, like the processing by the data extracting section 12 in step F104 shown in FIG. 5, all or a part of broadcast image data within the square area is extracted as identification data. Alternatively, text, a mark or a code, for example, within the square area may be extracted as identification data.

Then, the server control section 72 in step F405 controls the program identification processing section 74 to perform program identification processing by using the identification data.

If the identification data is broadcast image data, the program identification processing section 74 identifies the broadcast station by comparing it with a realtime broadcast image or a past broadcast image. If not, the processing may result in no applicable broadcast station. If the identification data is text, a mark or a code, the broadcast station is identified by comparing between marks, determining the letters or decoding the code. If not, the processing may result in no applicable broadcast station.

If the broadcast station is not identified, the program identification processing section 74 notifies the server control section 72 of the fact that the broadcast station is not identified. In this case, the server control section 72 returns the processing from step F406 to F401 and awaits the reception of the next imaged image data.

If the broadcast station is identified, the program identification processing section 74 notifies the server control section 72 of the information on the identified broadcast station. Notably, the information on the type of the image between a realtime broadcast image and a past broadcast image may be also notified.

In this case, the server control section 72 advances the processing from step F406 to F407 and controls the ratings calculating section 76 to perform the processing for viewing information.

The ratings calculating section 76 may perform processing of counting up the number of viewers for the broadcast station, which is currently identified, calculating the ratings (the instant ratings, the ratings for each time period, the ratings for each program, the ratings for each commercial, the ratings for realtime/recorded programs or the program ratings in consideration of the number of viewers of recorded programs and/or the like) and/or updating them based on the calculation result.

Then, the server control section 72 in step F408 performs processing of notifying the viewing information calculated (updated) by the ratings calculating section 76. That is, the server control section 72 transmits the viewing information through the communication section 73 to the advertiser's terminal 80 and/or broadcast station's terminal 81 and provides the ratings search result.

The processing in step F408 may be performed at predetermined time intervals or may be performed all at once a day instead of every time after step F407. In step F408, viewing information may be transmitted to the imaging apparatus 1, and the imaging apparatus 1 in response to the reception of the viewing information may display and output the viewing information.

In the system operation example as described above, the processing of creating viewing information based on imaged image data from many imaging apparatus 1 is performed in the server apparatus 70, and viewing information is created. Then, the viewing information is notified to advertisers and/or broadcast stations.

6. Effects of Embodiments, Various and Extension Examples

The embodiments described above allow the grasp of the number of viewers and/or the ratings in touch with reality since the state that a viewer is actually watching a television broadcast program is detected and is used for creating viewing information.

If the imaged image data imaged by the imaging apparatus 1 contains an image displayed by a display apparatus such as a television receiver, it can be determined that the displayed image is being watched by a user.

Therefore, it may be determined that a user is actually viewing the broadcasting if the broadcast program (broadcast station) is identified by the displayed image itself or text, a mark or a code, for example, contained in the displayed image. This can exclude the situation where a television receiver is shown but nobody is watching it from the measurement for the ratings. As a result, viewing information in touch with reality can be obtained.

In addition, as the number of users using the imaging apparatus 1 increases, the degree of effectiveness of the viewing information to be obtained increases.

Using a displayed image as the identification data allows the calculation of the ratings in consideration of what is actually viewed by users for each program or commercial. For example, a case where a user goes to a different room while a commercial is being displayed, for example, may be reflected on the viewing information by decreasing the ratings for the time for the commercial. For example, greatly effective information can be provided to an advertiser, such as how much the commercial thereby is being viewed.

The information in touch with reality including realtime viewing and recorded viewing can also be obtained. Thus, programs with high and low realtime characteristics can be also found as viewing situations based on actual situations.

The enjoyment that a user can view by being aware of the ratings can be created by the display of viewing information on the imaging apparatus 1 side as in System Operation Example II.

The imaging apparatus 1 in a simple configuration is applicable to the present system since the function of transmitting imaged image data to the server apparatus 70 is only important (that is, creation of identification data is not necessary) in the imaging apparatus 1 side in the case of System Operation Example III.

The invention is not limited to the embodiments above, but various variation examples and extension examples are considerable as configuration examples and/or processing examples of the imaging apparatus 1.

Having described the imaging apparatus 1 as an example of the imaged image data processing apparatus according to the embodiment of the invention, various apparatus are applicable as the imaged image data processing apparatus instead of imaging apparatus.

Figure 12:
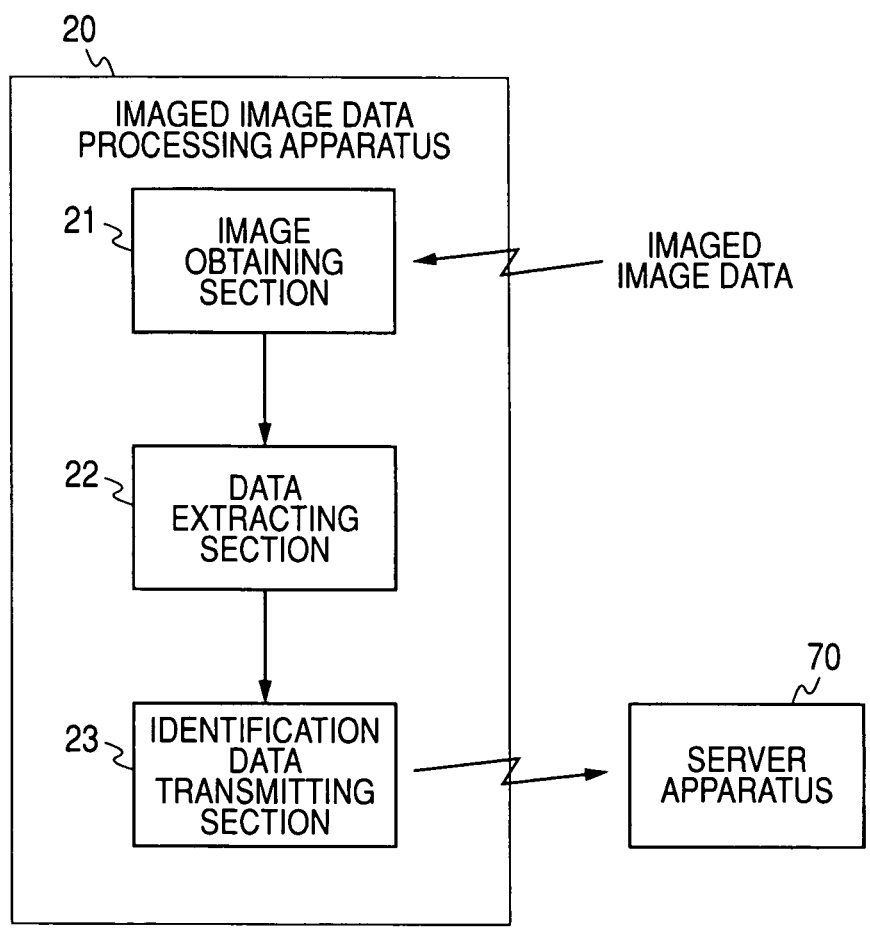
FIG. 12 is an explanatory diagram of another configuration example of an imaged image data processing apparatus according to an embodiment of the invention.

For example, the imaged image data processing apparatus 20 as shown in FIG. 12 in which an imaging section is provided separately may be considered as an example of the imaged image data processing apparatus according to the embodiment of the invention.

An image obtaining section 21 is communicable with a wearable imaging apparatus as shown in FIGS. 1A and 1B by wired or wireless communication.

The image obtaining section 21 receives imaged image data from the imaging apparatus and performs image analysis and extraction of identification data on the imaged image data in the data extracting section 22. Then, the identification data transmitting section 23 transmits the identification data to the server apparatus 70.

The imaged image data processing apparatus 20 without any imaging function in this way may be provided separately from a wearable imaging apparatus as shown in FIGS. 1A and 1B and is allowed to communicate with the imaging apparatus and may be allowed to transmit identification data to the server apparatus 70.

Image data is extracted as identification data, for example, according to the embodiment described above, but audio data may be used as identification data.

For example, a microphone may be provided in the imaging apparatus 1, and audio data obtained by the microphone, that is, audio data which can be guessed as the audio of a broadcast program may be added to identification data along with an image, a mark, a code or text, for example.

In this case, the server apparatus 70 side can use the audio data to match with the tune on the air, title-calling, voice of a performer and/or audio of background music to identify a broadcast program.

The imaging apparatus 1 may transmit identification data and imaging time information of imaged image data from which the identification data is extracted such that the server apparatus 70 side can perform effective image comparison by specifying the time.

Biological information of a user of the imaging apparatus 1 may be transmitted along with identification data.

For example, the imaging apparatus 1 may include a configuration functioning as a biological sensor and detect biological information of a user. The biological information may be a pulse rate, a heartbeat, an electrocardiogram information, an electromyogram, breathing information (such as the speed, depth and amount of ventilation of breathing), sweating, GSR (Galvanic skin reaction), blood pressure, arterial oxygen saturation, skin surface temperature, brain waves (such as information on α, β, θ and δ waves), blood flow change, the state of the eye or the like.

The biological sensor may be placed within the attachment frame of the eyeglass-shaped imaging apparatus 1 so as to be in contact with a side or the back of the head of a user for detecting information as described above. Alternatively, the biological sensor may be provided separately from the attachment frame part of the imaging apparatus 1 and may be attached to a predetermined part of the body.

Providing such a biological sensor allows the estimation of the emotion of a user while the user is viewing television broadcasting. For example, it may be estimated that a user is "enjoying", "excited" or "sad" or has "few emotional changes", for example.

The estimated emotion information may be created, and the estimated emotion information may be transmitted when identification data is transmitted to the server apparatus 70. Then, the server apparatus 70 can obtain information on the emotion of a user viewing the identified program.

This means that the number of people who are actually happy by viewing a happy program or the number of people who has a sad feeling by viewing a sad scene in a program can be counted. In other words, the emotion of viewers on the contents of a program can be determined, which may be effective information in addition to the ratings.

According to the embodiment above, the server apparatus 70 obtains, as viewing information, the number of viewers calculated by the ratings calculating section 76 (the estimated number of views or the estimated number of viewers) or the ratings (such as the instant ratings, the ratings for each time period, the ratings for each program, the ratings for each commercial, the ratings for realtime/recorded programs and the program ratings in consideration of the number of viewers of recorded programs).

According to the invention, not only the ratings and the number of viewers as described above but also various kinds of viewing information can be obtained.

For example, information on the constituent ratio of viewers can be obtained. The constituent ratio may be the ratio of males to females or on ages of viewers watching a program, for example. For example, a user using the imaging apparatus 1 may register his or her gender and/or age as personal information in advance, and a server apparatus 2 may hold the registered information in a user database along with the machine ID of the imaging apparatus 1. The imaging apparatus 1 may transmit the machine ID to the server apparatus 70 along with identification data in step F105 in FIG. 5 or 8 (or the imaged image signal in step F302 in FIG. 11). Thus, the server apparatus side can identify the attribute (gender and/or age) of the user based on the machine ID, which allows the counting of the number of viewers for each gender or age and the creation of information on the constituent ratio on genders and/or ages of viewers.

Instead of the server registration of a user attribute in advance, the imaging apparatus 1 may store the attribute of a user and transmit the attribute information of the user when identification data and/or imaged image data is transmitted, which also allows the creation of the same information.

The ranking information of viewed programs can also be created as the viewing information. For example, the number of viewers for each broadcasting in a certain time period may be counted to create ranking information describing the broadcast station the program of which is viewed by viewers in the time period, without calculating the ratings. Apparently, the ranking information for commercials, the ranking information for programs and so on can be created instead of the one for time periods.

Furthermore, as the viewing information, information can be created which is the ratio of whether broadcasting is actually viewed or not when a television receiver is on. In a case where the server apparatus 2 performs image analysis on imaged image data of the imaging apparatus 1 as shown in FIG. 11, for example, it can be determined that a user is not viewing broadcasting if no broadcast images are recognized continuously to some extent even though broadcast images of a television receiver are recognized within imaged images. In other words, the situation can be determined in which a user is not watching broadcasting by doing something different while a television receiver is on. Based on the analysis result, the ratio can be calculated which describes whether a target broadcast program or commercial is actually viewed or not.

According to the invention, various kinds of information on viewing situations can be created as the viewing information in this way, for example, and advantageous information can be provided to broadcast stations and/or advertisers.

It should be understood by those skilled in the art that various modifications, combinations, sub-combinations and alterations may occur depending on design requirements and other factors insofar as they are within the scope of the appended claims or the equivalents thereof.

What is claimed is:

1. An eyeglass-shaped image data processing apparatus configured to be worn by a user, the image data processing apparatus comprising memory for storing computer-executable instructions that, when executed by at least one processor, cause the image data processing apparatus to perform:
   obtaining image data when the image data processing apparatus is worn by the user, wherein the image data is obtained by an imaging section that captures images of an environment that is currently in a field of view of the user;
   determining whether the field of view of the user wearing the image data processing apparatus comprises a viewed program displayed on a display apparatus by extracting identification data for identifying, from the image data, the viewed program obtained when the viewed program is in the field of view of the user, the extraction comprising detecting in the image data an image of the display apparatus displaying the viewed program;
   and
   transmitting the identification data to an external viewing information creating apparatus that is configured to create viewing information based at least in part on the identification data; and
   displaying the viewing information on a display panel section of the eyeglass-shaped image data processing apparatus.

2. The imaged image data processing apparatus according to claim 1, wherein the imaged image data processing apparatus includes the imaging section integrally and obtains the imaged image data by imaging in the imaging section.

3. The imaged image data processing apparatus according to claim 2, wherein the imaging section comprises a CCD sensor or a CMOS sensor as an imaging device.

4. The imaged image data processing apparatus according to claim 1, wherein the computer-executable instructions, when executed by the at least one processor, cause the imaged image data processing apparatus to obtain the image data captured by the imaging section through communication with the imaging section, which is provided separately.

5. The imaged image data processing apparatus according to claim 1, wherein the computer-executable instructions, when executed by the at least one processor, cause the imaged image data processing apparatus to identify a displayed image on an image display apparatus within the image data by image analysis processing and extract the identification data from the displayed image on the image display apparatus if the displayed image on the image display apparatus exists within the image data.

6. The imaged image data processing apparatus according to claim 1, wherein the computer-executable instructions, when executed by the at least one processor, cause the imaged image data processing apparatus to extract, as the identification data, all or a part of a displayed image part detected within the image data.

7. The imaged image data processing apparatus according to claim 1, wherein the computer-executable instructions, when executed by the at least one processor, cause the imaged image data processing apparatus to extract, as the identification data, text, a mark, or a code within a displayed image detected within the image data.

8. The imaged image data processing apparatus according to claim 1, wherein the computer-executable instructions, when executed by the at least one processor, cause the imaged image data processing apparatus to transmit the extracted identification data to the external viewing information creating apparatus over network communication.

9. The imaged image data processing apparatus according to claim 1, wherein:
the computer-executable instructions, when executed by the at least one processor, further cause the imaged image data processing apparatus to perform:
receiving viewing information transmitted from the external viewing information creating apparatus; and
the imaged image data processing apparatus further comprises a display for displaying and outputting the viewing information.

10. A viewing information creating apparatus comprising:
at least one processor; and
memory for storing computer-executable instructions that, when executed by the at least one processor, cause the viewing information creating apparatus to:
receive identification data for identifying a viewed program, wherein:
the identification data is transmitted from an external image data processing apparatus configured to be worn by a user; and
the identification data is based on image data captured by imaging, by the external image data processing apparatus when the external image data processing apparatus is worn by the user, an environment in a field of view of the user and indicates whether the user viewed at least one program;
determine whether the field of view of the user wearing the external image data processing apparatus comprises the at least one program displayed on a display apparatus by identifying the at least one program based on the identification data by comparing the identification data to at least one broadcast image to identify a broadcast station providing the image data;
detect a state of the user indicating whether the user actually viewed the at least one program by determining, based on the identification data, whether the image data comprises a number of continuous images representing the at least one program that is above a threshold; and and
create viewing information based at least in part on the at least one identified program and the detected state of the user.

11. The viewing information creating apparatus according to claim 10, wherein the computer-executable instructions, when executed by the at least one processor, further cause the viewing information creating apparatus to perform:
transmitting the viewing information to an external machine.

12. A viewing information creating system comprising:
an image data processing apparatus configured to be worn by a user; and
a viewing information creating apparatus; wherein:
the image data processing apparatus comprises memory storing computer-executable instructions that, when executed, cause the image data processing apparatus to perform:
obtaining image data when the image data processing apparatus is worn by the user, wherein the image data is obtained by an imaging section that captures images of an environment that is currently in a field of view of the user;
determining whether the field of view of the user wearing the image data processing apparatus comprises a program displayed on a display apparatus by extracting identification data for identifying, from the image data, the program obtained when the program is in the field of view of the user; and
transmitting the identification data to the viewing information creating apparatus; and
the viewing information creating apparatus comprises memory storing computer-executable instructions that, when executed, cause the viewing information creating apparatus to perform:
receiving the identification data transmitted from the image data processing apparatus;
identifying the viewed program based on the identification data by comparing the identification data to at least one broadcast image to identify a broadcast station providing the image data;
detecting a state of the user indicating whether the user actually viewed the program by determining, based on the identification data, whether the image data comprises a number of continuous images representing the program that is above a threshold; and
creating viewing information based at least in part on the identified viewed program and the detected state of the user.

13. An image data processing method comprising the steps of:
obtaining image data, which is imaged by an eyeglass-shaped imaging apparatus that is configured to be worn by a user and that, when worn by the user, captures images of an environment that is currently in a field of view of the user;
determining whether the field of view of the user wearing the imaging apparatus comprises a viewed program displayed on a display apparatus by extracting identification data for identifying, from the image data, the viewed program obtained when the viewed program is in the field of view of the user, the extraction comprising detecting in the image data an image of a display apparatus displaying the viewed program;
and
transmitting the extracted identification data to an external viewing information creating apparatus that is configured to create viewing information based at least in part on the identification data; wherein the eyeglass-shaped imaging apparatus comprises a display panel section, and wherein the method further comprises displaying the viewing information on the display panel section.

14. A viewing information creating method comprising the steps of:
receiving identification data for identifying a program, wherein:
the identification data is transmitted from an external image data processing apparatus configured to be worn by a user; and
the identification data is based on image data captured by imaging, by the external image data processing apparatus when the external image data processing apparatus is worn by the user, an environment in a field of view of the user and indicates whether the user viewed at least one program;
determining whether the field of view of the user wearing the external image data processing apparatus comprises the at least one program by identifying the at least one program based on the received identification data by comparing the identification data to at least one broadcast image to identify a broadcast station providing the image data, wherein the identification data comprises the at least one program when the at least one program is in the field of view of the user;
detecting a state of the user indicating whether the user actually viewed the at least one program by determining, based on the identification data, whether the image data comprises a number of continuous images representing the at least one program that is above a threshold;
and
creating viewing information based at least in part on the at least one identified program and the detected state of the user.

15. An eyeglass-shaped image data processing apparatus comprising:
an imaging device configured to be worn by a user, for obtaining, when the image data processing apparatus is worn by the user, image data by capturing images of an environment that is currently in a field of view of a user;
memory for storing computer-executable instructions that, when executed by at least one processor, cause the image data processing apparatus to:
determine whether the field of view of the user wearing the image data processing apparatus comprises a viewed program displayed on a display apparatus, by extracting identification data for identifying, from the image data, the viewed program obtained when the viewed program is in the field of view of the user, the extraction comprising detecting in the image data an image of a display apparatus displaying the viewed program;
and
transmit the extracted identification data to an external viewing information creating apparatus that is configured to create viewing information based at least in part on the extracted identification data; and
a display panel section configured to display the viewing information.

16. A viewing information creating apparatus comprising at least one processor and memory for storing computer-executable instructions that, when executed by the at least one processor, cause the viewing information creating apparatus to:
receive identification data for identifying a viewed program, wherein:
the identification data is transmitted from an external image data processing apparatus configured to be worn by a user; and
the identification data is based on image data captured by imaging, by the external image data processing apparatus when the external image data processing apparatus is worn by the user, an environment in a field of view of the user and indicates whether the user viewed at least one program;
determine whether the field of view of the user wearing the external image data processing apparatus comprises the at least one program displayed on a display apparatus by identifying the at least one program based on the identification data by comparing the identification data to at least one broadcast image to identify a broadcast station providing the image data;
detect a state of the user indicating whether the user actually viewed the at least one program by determining, based on the identification data, whether the image data comprises a number of continuous images representing the at least one program that is above a threshold;
and
create viewing information based at least in part on the at least one identified program and the detected state of the user.

17. A viewing information creating system comprising:
an image data processing apparatus configured to be worn by a user; and
a viewing information creating apparatus;
wherein:
the image data processing apparatus comprises:
an imaging device to obtain, when the image data processing apparatus is worn by the user, image data by capturing images of an environment that is currently in a field of view of the user;
memory for storing computer-executable instructions that, when executed, cause the image data processing apparatus to:
determine whether the field of view of the user wearing the external image data processing apparatus comprises a program displayed on a display apparatus by extracting identification data for identifying, from the image data, the program obtained when the program is in the field of view of the user, the extraction comprising detecting in the image data an image of the display apparatus displaying the program;
and
transmit the extracted identification data to the viewing information creating apparatus; and
the viewing information creating apparatus comprises:
memory for storing computer-executable instructions that, when executed:
receive the identification data transmitted from the image data processing apparatus;
identify the program based on the identification data;
detect a state of the user indicating whether the user actually viewed the program by determining, based on the identification data, whether the image data comprises a number of continuous images representing the program that is above a threshold; and
create viewing information based at least in part on the identified program and the detected state of the user.

\* \* \* \* \*